April 10, 1962     D. W. DOWIE ETAL     3,029,169
WET STARCH IMPACT MILLING PROCESS
Filed Nov. 24, 1958     3 Sheets-Sheet 1

Inventors:—
Douglas W. Dowie,
Harry Douglas Martin,
By _____ Atty.

April 10, 1962 D. W. DOWIE ETAL 3,029,169
WET STARCH IMPACT MILLING PROCESS
Filed Nov. 24, 1958 3 Sheets-Sheet 3

INVENTORS.
Douglas W. Dowie,
Harry Douglas Martin,
By Mildred Oncken Atty.

United States Patent Office 3,029,169
Patented Apr. 10, 1962

3,029,169
WET STARCH IMPACT MILLING PROCESS
Douglas W. Dowie, La Grange, Ill., and Harry Douglas Martin, Kansas City, Mo., assignors to Corn Products Company, a corporation of Delaware
Filed Nov. 24, 1958, Ser. No. 775,908
10 Claims. (Cl. 127—67)

This invention relates to the manufacture of starch and by-products from grain starch-bearing materials, such as corn (maize) and grain sorghums, by the wet method; and in particular, it relates to improved methods for freeing and separating the starch and gluten from the fiber of such grains. This application is a continuation-in-part of our co-pending application, Serial No. 757,420, filed August 26, 1958, which is a continuation-in-part of application Serial No. 621,926, filed November 13, 1956, both now abandoned.

In the manufacture of starch from starch-bearing materials, such as corn (maize), it has been customary to steep the material and withdraw the steep water to evaporators for recovery of its solubles. The steeped grain is then comminuted and subjected to operations in water for separation of its component parts, i.e., the germ, the hull and the endosperm. The endosperm is a honey-combed arrangement of individual cells; such endosperm cells comprise a large number of individual starch granules embedded in a proteinaceous matrix which is enclosed in a cellulosic wall. The usual method of processing the grain is to break the grain coarsely (cracking) to free the germs, separate the germs by flotation and washing to remove accompanying starch and gluten (proteinaceous matrix) from the germs; then further grind the residue of the grain containing the endosperm and hull or fiber; thence, follow operations to separate, wash, dewater or squeeze during which starch granules and gluten are washed from the fibrous part of the grain by screening and separating operations of various types; the gluten usually follows the starch during this part of the process. The fiber, still containing a residual portion of starch, is dried and ordinarily used in animal feed. The remaining mixture of starch, gluten, and water from the aforementioned screening and separating operations, is then passed through reels, shakers, or similar equipment to remove as much fine fibrous material as possible. A great difficulty in past wet milling processes has been the presence of an appreciable amount of fiber reduced to such fineness by known past grinding processes that it cannot be removed from the starch stream without great difficulty and, therefore, becomes lost in the final starch product; this materially affects the quality of the end starch product. The streams containing starch, gluten, and water from the germ, coarse fiber and fine fiber separating and washing operations are then combined and, if desired, adjusted to proper gravity as by filters, centrifuges, and the like. The resultant mill starch stream is run through shallow, slightly inclined troughs (starch tables) or otherwise treated, for example, by centrifuges, for separation of the gluten and the bulk of the water from the starch. The remaining material may be subjected to one or more washing operations to further purify it, but a certain part of the fine fiber remains in the final product.

Heretofore Buhr mills have been used to grind the residue of the grain remaining after removal of the germ by flotation. Other types of mills such as attrition and hammer mills have been used with some success in this position in the stream. The Buhr mills depend for their grinding action upon large stone wheels which have been used for centuries in various types of milling. The grinding lands of these stone wheels wear down or dull rapidly and require frequent recutting or dressing operations to renew the grinding surfaces for satisfactory milling. These dressing operations are expensive both as to the amount of labor involved and because each mill is out of service about eight hours every five days during dressing, etc. There are other types of attrition mills wherein the grinding surfaces are of steel or like hard metal. However, these machines depend for efficiency on the closeness of their grinding surfaces which inevitably leads to excessive wear and regular knock-down periods for purposes of repair, dressing grinding surfaces, etc. Additionally, certain types of hammer mills have been used with some success for this purpose. This type of mill utilizes a vertical shaft rotating at high speed having mounted thereon crushing elements which may be hammers, bars, or rings, either fixed or pivoted thereto. Here the starch-bearing material in its water suspension is usually driven against a cylindrical perforated cage or screen. The hammers reduce the material to sufficient fineness to pass through the openings in the screen. Usually, the material is held in the screen or cage until reduced to sufficient fineness to pass through the openings thereof, and this results in a great deal of violent degradation of the product; in some machines the residue is dropped from the bottom of the screen but the result is the same, to wit, a shearing action markedly increasing fibrous fines.

Still a further and most important disadvantage of all of these mills resides in the fact that the fiber as well as the starch is continually ground; thus, an undesirably large portion of the fiber becomes unmanageably small and, by the same token, very difficult, if not impossible, to separate from the starch. In fact, if maximum separation of the starch and gluten is to be attained, it is impossible to avoid the production of a considerable amount of fine fibrous material which passes through a bolting cloth having an aperture of about 0.0032 inch or 82 microns; this cannot help but have a very important deleterious effect on the resulting end starch product.

While our invention has wide application for the extraction of starch from a variety of materials, it is particularly well suited for use on corn. A knowledge of the general structure of the corn kernel is important to an understanding of the problems concerned with the extraction of starch therefrom and the solution of those problems by our invention. A large portion of the kernel comprises starch granules embedded in a proteinaceous matrix, and groups thereof are encased in a cellulosic covering or wall. The kernel, of course, also includes a germ and the initial steps in a wet milling process are designed to break the kernels and separate out the germ. The degerminated material is then processed in such manner as to free the starch granules from the proteinaceous matrix and rupture or break the cellulosic casing or wall of the individual endosperm cells to release the granules. All proteinaceous material is separated from the starch granules and the object is to obtain a mass of pure starch granules as an end product. One of the most difficult problems in this starch extraction process is to eliminate the cellulosic or fibrous material. The smaller these particles are, the more difficult are the separating steps. Indeed, if these particles are too small, it may be impractical to separate them from the main body of the starch and they therefore remain therein. On the other hand, it may be so important to remove all traces of fibrous material that the overall yield of starch is sacrificed in favor of obtaining a pure product. One of the most important aspects of our invention is the provision of a process wherein the endosperm cells are ruptured in such fashion that the fibrous particle sizes are large and therefore all fibers may be separated from the starch granules with ease. Thus, by the practice of our invention, it is possible not only to achieve a purer starch of high quality but also to increase yields and thereby effect substantial economies in starch manufacture.

The present invention, as previously noted, is concerned with a wet milling process, particularly designed for the extraction of starch in granule form from a starch-bearing material such as corn or like grain. The material such as corn is initially soaked (steeped) in water. Thus, the starch-bearing material, e.g. corn, initially containing about 15 percent by weight of water, is steeped in a water solution of sulfur dioxide during which the corn absorbs to about 45 percent by weight of water. This results in a weakening of the proteinaceous matrix or starch-protein bonds to facilitate the release of the starch granules during the milling process. Thus, the desired result in wet milling is a mess of pure separated starch granules. This is in marked contrast to a dry milling process such as is practiced in the manufacture of flour from wheat. In dry milling the object and end result is to produce flour, i.e., particles of endosperm (usually groups of cells); this food product need not be broken into its ultimate constituents, i.e., separate granules. The dry finished product, flour, although containing some individual starch granules, also includes many particles which are groups or fragments of endosperm cells. The steeping step in a wet milling operation so conditions the corn as to make possible the release of the starch granules in individual form, a result unnecessary in dry milling.

The present invention comprises a method which not only greatly facilitates such release but by virtually eliminating production of fine, fibrous, practically unseparable non-starch materials, markedly increases final product quality and quantity.

We have discovered that by the use of an impact mill, such as described hereinafter, many of the difficulties mentioned above, as well as others, are successfully overcome. Thus, unlike the Buhr mills, attrition mills, hammer mills, etc., an impact mill without grinding, breaks or ruptures the fibrous material by violent impact, into comparatively large particle sizes, which may be separated from the starch granules with comparative ease. A simple analogy may be helpful to an understanding of this phenomenon. The endosperm cells with starch granules encased therein might be compared to a paper bag of marbles. Throwing such a bag against a wall would be comparable to the impacting of this invention. This would release the marbles (granules) and leave the bag (cell wall) in one or more large pieces. However, should the bag be ground, as in a Buhr mill, the marbles (granules) might survive but the bag would be ground into small pieces. Because of this result, only possible in a wet milling process by using impacting machines as described therein, we believe that this step is primarily responsible for the marked increase in yield by this new milling process.

The impact mill has the advantage of being ideally suited to increase further the efficiency of a wet milling process because the corn or like material has previously been hydrated by the steeping step so that the outer hull of the kernel is soft, the proteinaceous matrix embedding the individual starch granules has been weakened and finally the cellulosic wall of each cell enclosing the granules has also been softened and is more resistant to breakage than in dry form. Consequently, such hydrated starch bearing material fed to the centrifugal impact mill in a manner to be presently described is ideally suited for a pure impact action as distinguished from the grinding, shearing, crushing, action of machines heretofore used in this part of the wet milling process. By such impacting the proteinaceous matrix is broken down with more facility as are the endosperm cell walls to release the individual starch granules; the fiber is simultaneously maintained in relatively large and more easily separable pieces: the result is a substantially increased yield of higher quality starch.

The main object of the present invention is to provide certain improvements in the wet milling of starch-bearing materials. A specific object of the invention is to provide an improved process for freeing and recovering starch from cracked degerminated grain. Another object is to provide a simplified and more economical method for recovering starch from starch-bearing materials, particularly grain. A further object of the invention is to provide a process of dislodging and separating starch from degerminated starch-bearing materials, whereby the fiber portion remains in relatively large pieces. A further object of the invention is to reduce the number of screening and washing operations now required in such wet milling. Yet another object is to provide a method of such wet milling wherein the adjustment of the gravity of the mill starch prior to tabling or centrifuging operations may be eliminated. Still another object is to provide a process for recycling of certain process waters so that the present improvements in the wet method of manufacturing starch may be readily adapted to use in a closed or "bottled-up" wet milling system involving counter-current flow and re-use of water as is well known in this art. Another object is to eliminate reduction in fiber size to a point where such particles may be unseparable from the end product with resultant deleterious effect thereon. A final object is to increase the yield of pure starch from such materials as corn (maize). Other objects will in part be obvious and in part pointed out hereinafter.

The invention accordingly comprises the method embodying the several steps thereof, combinations and arrangements of such steps which are adapted to achieve such results, all as exemplified in the detailed disclosure hereinafter set forth, and the scope of the invention will be indicated in the claims.

For a fuller understanding of the nature and objects of the invention, reference should be had to the following detailed description taken in connection with the accompanying drawings, in which.

According to the improved process of the present invention, the wet starch-bearing material is impacted by throwing it against a surface in an impact mill, for example, of the type herein described wherein the starch-bearing material is fed to a rotor rotating at a relatively high speed, and is impacted but not ground, mashed, sheared, or torn as in prior machines in use.

More particularly, the material is centrifugally thrown outwardly over the rotor, hitting impacting pins or like devices on the rotor and finally target impacting pins or like devices. In this manner, as will be described in more detail, the starch-bearing material is impacted at very high velocities, thereby allowing for a disintegration of the material along weakest lines of cleavage. Such action, as will be better understood after the more detailed description to follow, results in an immediate rupturing of the fibrous casings or walls of kernels and cells into large, easily separable materials. This is in marked contrast to reduction previously effected in wet milling with apparatus such as Buhr mills, attrition mills, and hammer mills. Such machines depend for distintegration on a shearing, flattening, mashing, and tearing action, independent of the weakest lines of cleavage of the fiber; in fact, the fibrous pieces are severed crosswise of these lines. Of necessity, this must create a large amount of fine fibrous material.

Our invention, which comprises a novel and highly advantageous method of wet milling starch-bearing material, is not limited to any particular type of impacting machine. However, the essence of the invention comprises utilization of the marked advantage of impact mills used where Buhr mills, attrition mills, and hammer mills are used in a wet milling process. Impact mills of many designs may be used with success in the practice of our invention. However, we here describe illustratively one machine which we have found to be capable of achieving the impacting effect for the practice of our invention.

Figure 1:
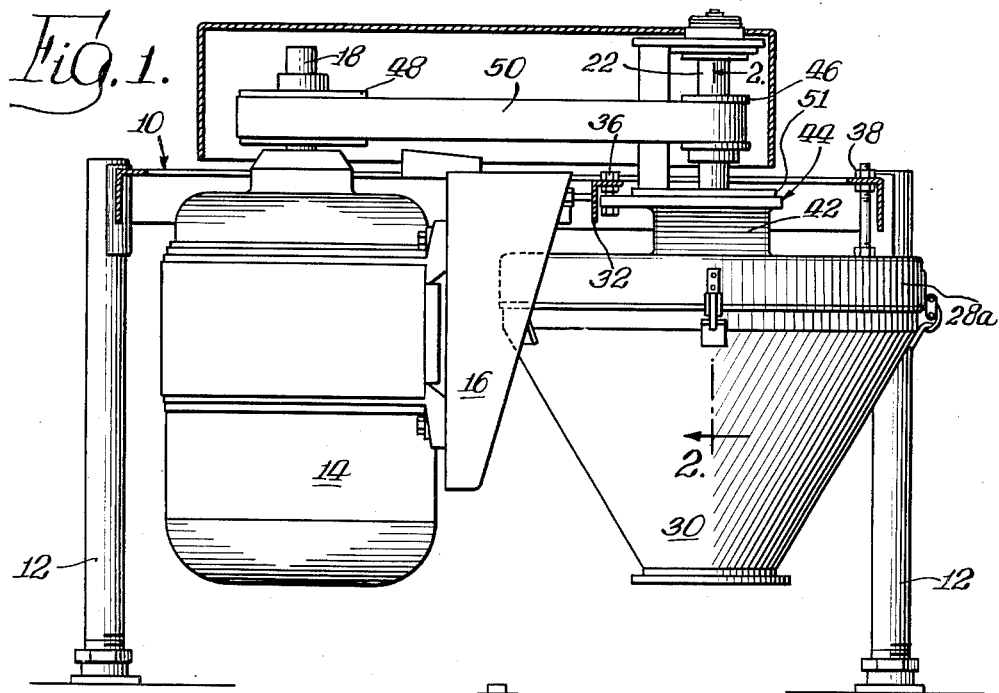
FIGURE 1 is a front elevation, partially broken away, of a centrifugal impacting mill which may be used successfully in practicing the method comprising our invention.
Figure 2:
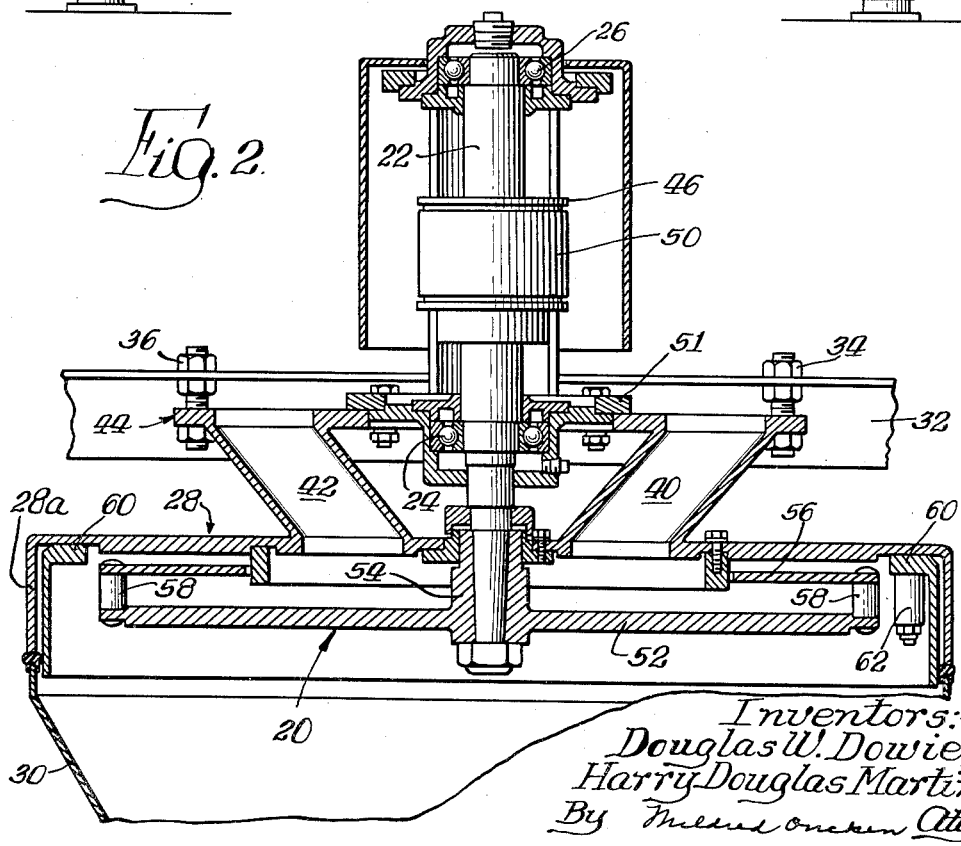
FIGURE 2 is a fragmentary vertical sectional view taken along the line 2—2 of FIGURE 1 and showing the rotor and impacting element for centrifugally impacting starch-bearing material in the manner of the present invention.

Referring to FIGURE 1, this apparatus comprises a substantially rectangular main supporting frame generally indicated at 10 supported by legs 12. A motor 14 is suspended from frame 10, being directly secured to a supporting plate 16 depending downwardly from the frame to support the motor with drive shaft 18 extending vertically upwardly from motor 14. As best seen in FIGURE 2, the rotor 20 of the impact mill is mounted on a drive shaft 22 extending vertically upwardly and rotatably mounted in bearings 24 and 26. The shaft 22 extends through a top supporting plate 28, which not only forms a closure for the upper portion of the impact mill but also has suspended therefrom the casing 30. The rotor 20 and associated driving mechanism is thus rotatably supported beneath plate 28 and is completely enclosed by the depending annular flange 28a thereof together with casing 30. A cross bar 32 (FIGURE 1) is connected to frame 10, and the top supporting plate 28 is suspended from the frame and cross bar by the stud bolts 34, 36, and 38, thus providing a three-point suspension therefor.

Chutes 40 and 42 are formed in an upper structure generally indicated at 44 and diverge from the central portion of plate 28 immediately above the corresponding portion of rotor 20. Shafts 22 and 18 carry pulleys 46 and 48, respectively, which are interconnected by a belt 50 so that the motor 14 may drive rotor 20 through shaft 22. Thus, the impact mill with related parts comprises the upper supporting plate 28 with suitable chutes 40 and 42 for entrance of the grain to be milled and an upper plate 51, all of which are integral and provide a firm base for the attachment of both bearings 24 and 26.

The rotor comprises a bottom circular plate 52 having a hub 54 bolted or otherwise secured to shaft 22. It also includes an upper ring plate 56 and a plurality of pins 58 evenly spaced about the circumference of plates 52 and 56 and connected therebetween. These pins 58 may take any convenient shape, although in one wet milling process as described herein we have found pins, substantially round in shape as shown in FIGURE 2, to be entirely suitable. The surface of plate 52 from the hub 54 to the row of pins 58 is free from obstruction so that in operation the acceleration of the material moving toward the pins is unimpeded. An outer ring 60 is secured to plate 28, and a plurality of circumferentially spaced impacting pins 62 are bolted to and depend downwardly therefrom directly in the path of material being discharged by the rotor.

In operation, motor 14 drives the rotor 20 at high speed, and material to be treated is discharged from chutes 40 and 42 on plate 52 of the rotor adjacent hub 54. As it is impelled outwardly by centrifugal force, it spreads out in a thin, substantially even stream over the unobstructed surface of plate 52. Accordingly, it accelerates rapidly and in such a thin stream hits and is hit by pins 58 resulting in breakage of the individual particles of the material being treated to release individual starch granules. It then shoots outwardly for further severe impacting on impacting pins 62. The unobstructed space between the hub 54 and pins 58 together with the concentrically arranged rows of pins 58 and 60 make for a highly efficient impacting action most important to the successful practice of our milling methods here described.

Centrifugal impact mills, such as just described, may be used with great advantage in that stage of a wet milling process immediately following the degermination steps. For example, degerminated corn in such a wet milling process contains free starch, gluten, pieces of endosperm of various sizes, and hull or fiber portions which may or may not have adhered to the endosperm. The ratio of these materials varies considerably, for it is dependent upon grain quality, steeping conditions, and the quality and character of the preceding degerminating steps. The grain, before the degermination step, is subjected to a preconditioning step by steeping to saturation which peculiarly adapts it to the subsequent severe treatment which it receives in the impact mill where it is subject to impact. This impact is performed substantially without abrasion or rubbing. The effect of said impact is to break open the fibrous cells and knock the starch granules loose and spill them out from the fiber all without substantial abrasion or rubbing. Thereby the fibrous particles retain larger size than heretofore. The degermination step is a preparatory step to free the kernel of the germ, which, so far as starch extraction is concerned, is merely an impurity. The fundamental objective in milling this material is, of course, to free the starch granules from surrounding proteinaceous material while leaving the fiber in such large form as to be separated with facility in the latter milling steps. Of course, one of the most important problems is to free the starch of all fiber or hull portions, and it goes without saying that if such hull portions become very fine, it becomes difficult if not impossible to separate them out as desired. Stated in another way, it is desirable in milling not to reduce the fiber particle size to such point that it will become too fine to be practically separable. We have discovered that by utilization of an impacting machine in our process, we have been able to achieve results far superior to anything possible with Buhr, hammer, attrition mills or anything else known before our invention.

The components of degerminated corn have certain properties well suited to the pure impacting action of an impacting mill. Generally speaking, the hull in such material is very resilient and the starch-bearing material is friable. Accordingly, when impacted, we believe the fiber tends to flex and this flexing breaks the bonds between the starch-bearing material and the hull. Further, it is our opinion that in the steeping process the protein bonds between the starch granules become weak as do the cell walls. Thus, when struck a sharp blow as in impacting machines, the cells rupture to release the granules.

We believe that such end result may be further attributed to the fact that cells in the hull are long and thin, with the weakest bond therebetween parallel to the cell walls; thus, in an impacting action the hull splits longitudinally in the manner of split wood. This is believed to be in part responsible for the very improved results obtained by impacting machines in a wet milling process. We do know that this results in a higher starch extraction factor, i.e., (1) much more fiber material in large sizes readily separable from the starch with great economies, and (2) removal of starch granules in their final desired pure state. Indeed, it is not uncommon for a Buhr mill or like grinding apparatus to reduce all of the material to a fineness which will pass a screen having an aperture of about 0.093 inch or 2.362 mm., whereas by using the centrifugal impact mill here, approximately 60 percent of the material remains on such a screen, even after two passes through such a mill.

It should be remembered that this degerminated material being passed to the centrifugal impact mill in a wet milling process has been steeped and hydrated to such an extent that it has absorbed to about 45 percent by weight of water. In such condition the pliability of the hull is substantially greater than the enclosed endosperm and, by the same token, this hull is more resistant to a pure impact. Given sufficient impact action, the cells rupture to release the starch granules but such impacting action in a centrifugal impact mill such as just described is not of sufficient magnitude to substantially reduce the size of the fibrous material. This is in marked contrast to the grinding action achieved by Buhr, attrition, hammer mills, and like apparatus which are commonly used at this point in a wet milling process.

Returning to FIGURE 2, pins 58 are circumferentially evenly spaced about the rotor 20, and the clearance therebetween is larger than the largest dimension of any of the degerminated starch-bearing material which is to be processed by the machine. By the same token, the space between pins 58 and impacting pins 62 should also be larger than the largest dimension of any of this starch-bearing material. Further, the rotor 20 must be driven at sufficient speed to rupture the material as it passes through the machine. Thus, in passage through the impacting mill, the starch-bearing material is never subjected to any rubbing, tearing, or shearing action; the work done on the material by the machine is confined exclusively to pure impact blows and this we term "pure impacting." More particularly, the material is directed by chutes 40 and 42 to the central or hub portion of the rotor 20 which is preferably rotated at a considerable speed to pick up such material and shoot it outwardly by centrifugal force and very great velocity. The material then hits the pins 58 where it may receive one or more blows of considerable intensity before being flung out against the impacting pins 62. Thus without any meshing, tearing, or shearing, the material drops down and is released through the casing 30. These centrifugal impact mills accelerate the degerminated grain before striking it with moving surfaces (pins 58 in the machine described) and stationary surfaces (pins 62 as described), but it should be understood that may variations of the equipment shown are easily within the scope of this invention.

The term "impact" or "impacting," as used throughout the specification and claims, means substantially instantaneous acceleration of particles by forcibly contacting said particles with a plurality of rapidly moving surfaces, or the instantaneous deceleration of rapidly moving particles by contacting said particles on a plurality of surfaces; the clearance between the accelerating surfaces and the decelerating surfaces must be large enough to avoid any appreciable abrasion of the particles as they pass from the accelerating surfaces to the decelerating surfaces; and provision must be made to allow the particles to pass quickly from the areas containing the accelerating and decelerating surfaces to substantially inhibit abrasion and heat generation, thus minimizing particle size reduction and heat damage.

Our various tests with this equipment indicate that the velocity imparted to the material by the impact mill is not a critical factor. Of course, it is necessary to achieve sufficient velocity to effect necessary breakage of the various structures imprisoning the starch granules. But this may be accomplished by a single machine operating at very high speeds designed for more impacting, or it might be accomplished by two or more machines operating at lower speeds in series. It goes without saying that the higher the speed, the greater power consumption, and the more wear and tear on the machine. Therefore, it becomes a matter of economics to decide on the type of machine to be used and the velocities to be imparted to the material being treated. To some extent this would depend upon the character of the starch-bearing material to be treated, the cost of the impacting equipment, and the cost of power where the equipment is to be used. Perhaps, the essence of the type of centrifugal impacting action which we may utilize in our novel method of wet impact milling is the provision of a high-speed rotor which has sufficient distance between its hub portion and the impacting area where the material to be treated is initially directed to permit the material to achieve high velocities when traveling over a substantially unobstructed area before encountering the impacting elements. In other words, this unobstructed area in the rotor allows centrifugal force to induce the individual particles to pick up such velocity as to effect the necessary bursting or splitting action when the particles reach the impacting area. As an example the rotor 20 of the machine herein described may be driven at a peripheral velocity of 20,000 feet per minute where the radial spacing between pins 58 and 62 is substantially one inch.

This is an entirely different approach to a problem only encountered in the wet milling of starch-bearing materials and not found in dry milling operations. In dry milling, e.g., wheat to flour, the broken particles of wheat, which may be termed starch-bearing materials, are finally reduced to agglomerates of starch cells rather than individual starch granules as is the case in a wet milling process. Thus, in a dry milling operation the problems in reduction are entirely different than those in a wet milling operation. In the first place, the product being milled is essentially dry as distinguished from the hydrated starting product resulting from the steeping operation in a wet milling process. Secondly, and more important, the end result requirement in each case is quite different. Flour may comprise some individual starch granules, but many of the flour particles are agglomerates of the starch granules held together by a proteinaceous matrix, whereas the end result desired in a wet milling starch extracting process is to obtain individual starch granules free of any adhering protein.

The use of impact mills in the wet milling of cereal grains, such as corn, represents a decided improvement over the art. First, as already pointed out, the fiber is not reduced to a fine size such as was formerly the case, and hence certain separating operations can be eliminated or at least materially reduced with concomitant economical advantages. Further, it has been found that the starch content of the fiber after impacting is lower, i.e., another way of saying that the released starch yield from such impacting is much greater than experiences with other equipments, such as Buhr, attrition, and hammer mills. Also, the quality of the starch is immensely improved as evidenced by its behavior when used, for example, as a starting material in the manufacture of corn syrup. The explanation of this improvement is apparently related to the content of the fine fibrous material in the starch. In the earlier process it was expected to have a certain amount of fine fibrous material with attendant deleterious effect in many ways, e.g., syrup manufacture. These various advantages are better illustrated by the data shown in Table I.

*Table I*

|  | 1 Pass Buhr Mill | 2 Pass Buhr Mill | 2 Pass Impact Mill |
| --- | --- | --- | --- |
| Starch in Fibers (Washed in Laboratory), percent | 12.1 | 8.5 | 3.6 |
| Protein in Gluten, percent | 62.9 | 64.8 | 70.0 |
| Fiber on 300 Mesh (Grains per Gallon) | 14.0 | 14.0 | 8.1 |
| Corn Syrup—Color [1] of Neutralized Converter Liquor | 3.7 | 3.6 | 1.2 |
| Corn Syrup—Color [1] of Finished Products | 1.1 | 1.0 | .7 |
| Corn Syrup—Heat Color [1] (2 Hours) | 2.0 | 1.8 | 1.3 |
| Percent Carbon Needed to Give Color of Finished Product | .686 | .545 | .418 |
| Starch Yield Based on 1 Pass Buhr Mill as 100% | 100 | 101.8 | 102.3 |

[1] Measured as in a Coleman spectrophotometer.

The present invention is particularly concerned with the extraction of high purity starch granules from naturally occurring starch bearing material, wherein the starch in a matrix of proteinaceous material is lodged in cells and encased by fibrous material.

The broad concept of the invention is that by pre-conditioning the starch bearing material, certain properties can be developed which adapt the material to starch extraction through a very vigorous treatment which consists in subjecting the preconditioned material to the operation of an impacting machine which produces impact substantially without abrasion or rubbing. This impacting operation amounts to imparting a high velocity to particles of the preconditioned material and impinging them upon targets, both moving and stationary, thereby developing a tremendous release of energy from the moving particles which ruptures, bursts, or breaks the cellulosic envelope, liberating the contained starch granules, with little or no comminuting action on the non-starch material whatsoever. The preconditioning involves the step of steeping small masses or bodies of the naturally occurring starch bearing material in water to substantially saturate the same. In the case of corn employed as the raw material of choice, the kernels are steeped in water containing sulfur dioxide, and absorb to about 45% by weight of water.

The qualities which are thereby developed are essential to extraction of starch from grain by impact which breaks open the cells, spills out the starch and knocks it loose from the fiber. Those qualities include the change in consistency of the fibers from their original hard and somewhat brittle condition to a relatively pliable, tough, rubbery consistency which permits of impacting with little or no shattering, and with retention of the fiber in larger pieces than those which would result from grinding the kernels in known manner.

The preconditioning appears also to relax the grip of the starch containing fibrous material upon the starch granules and the matrix in which they are held, and seems to permit the starch granules to move more easily with respect to each other and with respect to the enclosing fibrous material. The conditioning step toughens the fibrous material, but does not adversely affect the properties of the individual granules of starch as such. The starch granules appear to be loosened in their matrix, and to be loosened also with respect to the walls of the cells in which they are encased, so that these granules may be more easily released by the impacting action.

Figure 3:
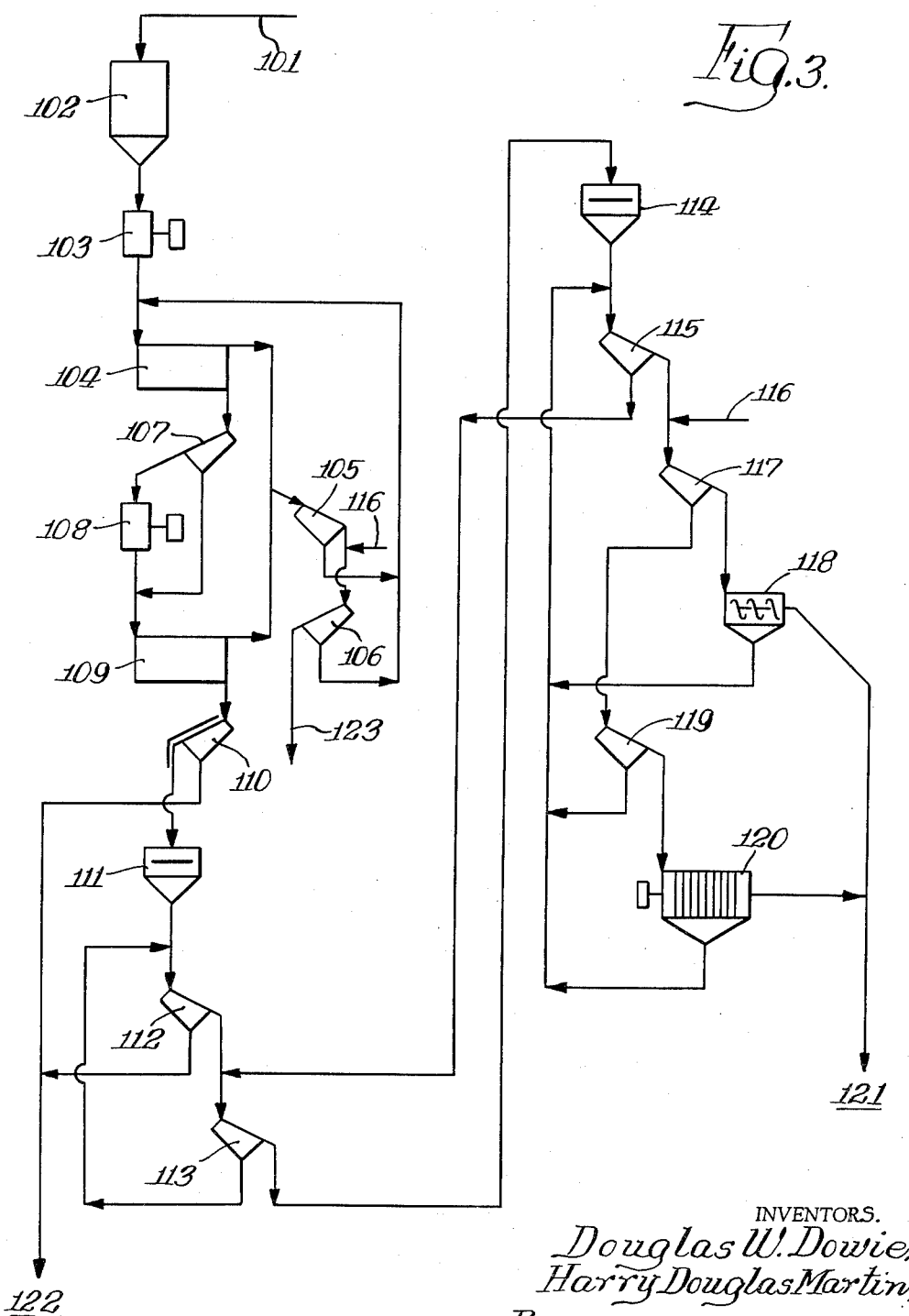
FIGURE 3 is a diagrammatic flow diagram of a wet milling process for extraction of starch from starch-bearing material utilizing the method of the invention described herein.

By thus rendering the fibrous constituents of the raw material flexible and pliable and the accompanying starch granules more loose or fluid with respect to the fibrous material, and with respect to their matrix and each other, we are able, by impacting operation substantially without abrasion or rubbing, in an impact mill, to rupture the cells containing the starch granules, knock the starch granules loose from the fiber and spill them out with a minimum breaking or fracturing of the fibers and more complete release and discharge of the starch granules from the confining proteinaceous material and fiber. Thereby a higher recovery of starch from a given raw material is brought about, and a purer starch, that is, a starch with less fibrous content, is obtained. Various systems and various forms of impact machines can be devised to embody the present invention and gain the benefits thereof. An example of such a system is shown in FIGURE 3 now to be described.

The corn enters the steep tank 102 via conveyor 101 where it is subjected to the action of a warm water solution of $SO_2$, i.e., sulfur dioxide. The steeped corn is then discharged into a degerminating mill 103 for cracking prior to germ removal. This mill 103 may be an attrition mill, a hammer mill, or, in certain instances, a centrifugal impact mill designed for a heavy duty operation. This mill 103 breaks open the individual kernels thus to free the germ. The material released from mill 103, including the germ fraction is then sent to a germ separator 104, and the germ fraction is washed by a process water stream 116 derived from the starch washing operation to be presently described. The germ, leaving the germ separator apparatus 104, passes over shakers 105 and 106 where adhering starch is removed, and the germ is then sent to a germ dryer via conveyor 123. A slurry comprising fiber and starch, degerminated in separator 104, is next passed over a dewatering screen 107, the overs from which go to an attrition mill 108. Here again an impact mill may be substituted for an attrition mill with desirable results. The filtrate from the screen 107 is reintroduced and the slurry from the attrition mill 108 combines therewith and is reintroduced into the separator 109. The germ from the separator 109 enters the germ washing system 105 and 106 while the fiber and starch slurry pass over the double-deck shaker 110, the screenings from both decks of which pass to an impact mill 111, illustratively of the general type shown in FIGURES 1 and 2. The fiber in the mill discharge is separated from the starch slurry on screen 112, and the filtrates from screen 110 and screen 112 combine to produce mill starch as indicated at 122. The fibers from screen 112 are again washed on screen 113 and sent to another impact mill 114. After being treated in another such impact mill 114, the fibers are washed on screens 115 and 117. Process water 116, used to wash the fibers, is added to the system between screens 115 and 117, while the fiber of screen 117 is sent to a squeezer 118 and then to a food drying operation 121. The filtrate from the screen 117 passes over a screen 119 and the fiber collected there is dewatered in fiber press 120, from which it is sent to feed drying 121. The mill starch as indicated at 122 is separated into gluten and starch streams in a conventional manner, e.g., by centrifuges. The process water derived from gluten overflow may be returned to the steeps in the tank 102 for re-use, and the process water derived from dewatering the starch underflow and washing the starch cake may be re-used in the process, for example, by introduction at 116. Fresh water is introduced into the system to wash the starch and, generally speaking, it is advisable to use a countercurrent system of wet starch processing.

Figure 4:
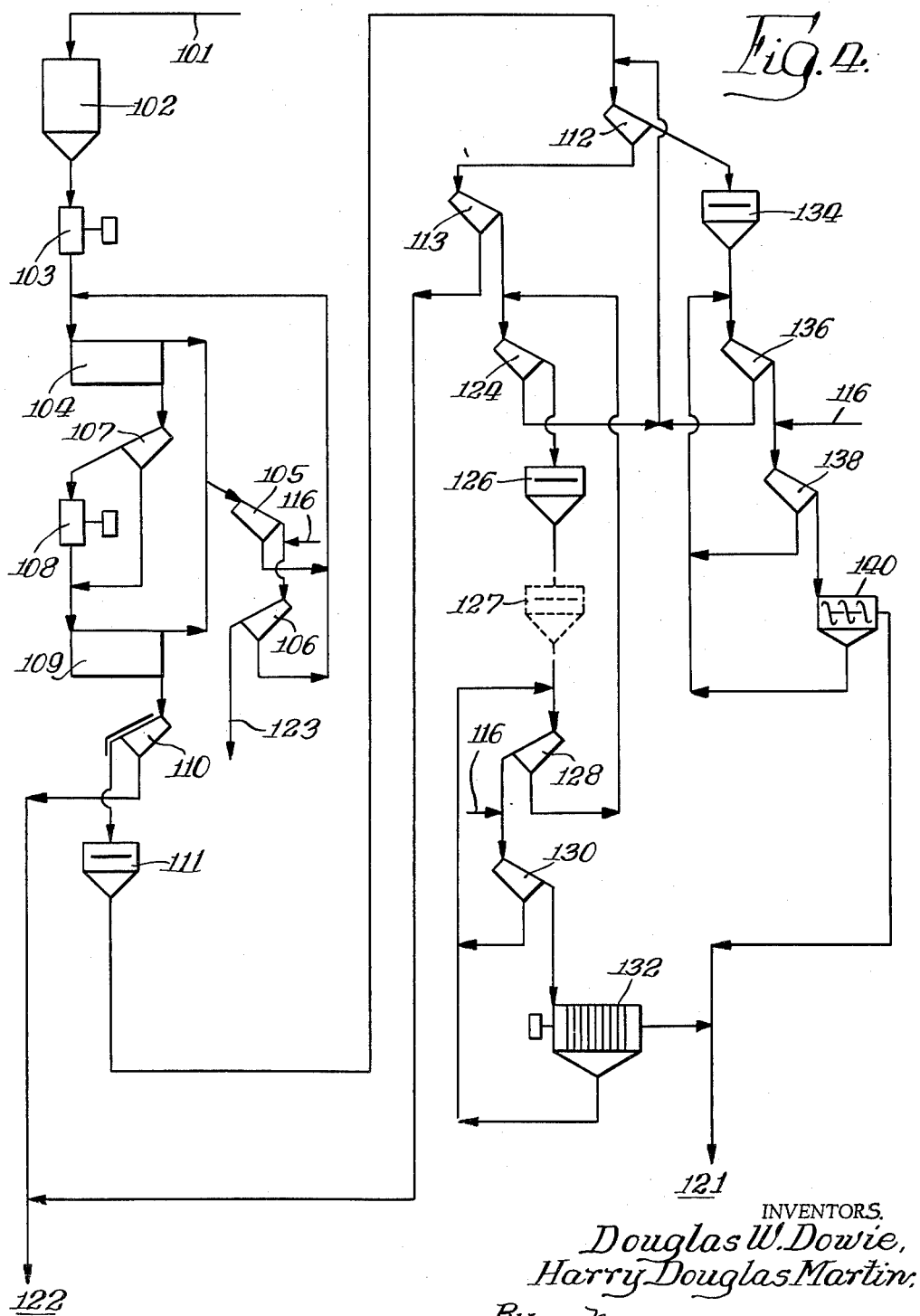
FIGURE 4 is a diagrammatic flow diagram of a wet milling process utilizing another embodiment of our invention described herein.

Alternatively, another embodiment of our invention may be practiced as diagrammatically indicated in FIGURE 4. The method through the first impact mill 111 is shown as identical with that shown in FIGURE 3. Hence, the coarse fiber discharged from the impact mill 111 is separated from the fine fiber and starch slurry on screen 112. The fine fiber in the filtrate from screen 112 is separated from the starch slurry on screen 113 and filtrates from screens 110 and 113 combine to produce mill starch 122. The fibers from screen 113 are thence washed on screen 124 and then go to other impact mills 126 and 127 working in series. Here, as usual, depending on circumstances one mill may be used. After treatment therein, the fibers are washed on screens 128 and 130. Process water 116 for washing the fibers is added to the system between screens 128 and 130. Fiber from the screen 130 is dewatered in a fiber press 132 and is then sent to feed drying 121. The coarse fibers from screen 112 are sent to another impact mill 134 and, after processing therein, the fibers are washed on screens 136 and 138. Process water 116 for washing the fibers is also added to the system between screens 136 and 138. The fiber from screen 138 is sent to squeezer 140 and then to feed drying 121. Mill starch 122 is separated into gluten and starch streams in the conventional manner, e.g., by centrifuges. In all other respects, this process is similar to that described with respect to FIGURE 3.

It will thus be seen that the objects set forth above, among those made apparent from the preceding description, are efficiently attained and, since certain changes may be made in carrying out the above process without departing from the scope of the invention, it is intended that all matter contained in the above description or shown in the accompanying drawings shall be interpreted as illustrative and not in a limiting sense.

It is also to be understood that the following claims

We claim:

1. In a wet starch milling process wherein the starch granules are separated from the other parts of grain such as corn (maize), the steps of steeping the kernels in water to substantial saturation of the same whereby the fibrous material of the grain is rendered more tough and flexible than it is in its air-dry state, breaking the kernels, separating the germ from such broken material, impacting said broken material with sufficient force to break the endosperm cells and release the starch granules from the proteinaceous material without creating substantially any unseparable fine proteinaceous material, and separating said proteinaceous material from the starch granules.

2. The process defined in claim 1 wherein a majority of the material after the impacting step will remain on a screen having an aperture of about 0.093 inch.

3. The process defined in claim 1 in which at least 60 percent of the material after the impacting step will remain on a screen having an aperture of about 0.093 inch.

4. In a wet starch milling process wherein the starch granules are separated from the other parts of grain such as corn, the steps of steeping the kernels in water to substantial saturation of the same whereby the fibrous material of the grain is rendered more tough and flexible than it is in its air-dry state, breaking the kernels, separating the germ from such broken material, impacting said broken material with sufficient force to break the endosperm cells and release the starch granules from the proteinaceous material without creating substantially any unseparable fine proteinaceous material, washing all proteinaceous material from the starch granules, and separating substantially all proteinaceous material from the starch granules to leave a pure starch product.

5. In a wet starch milling process wherein the starch granules are separated from the other parts of grain such as corn, the steps of steeping the kernels in water to substantial saturation of the same whereby the fibrous material of the grain is rendered more tough and flexible than it is in its air-dry state, breaking the kernels, separating the germ from such broken material, centrifugally impacting said broken material with sufficient force to break the endosperm cells and release the starch granules from the proteinaceous material without creating substantially any unseparable fine proteinaceous material, and separating said proteinaceous material from the starch granules.

6. A process for extracting starch from small masses of naturally occurring starch bearing material which comprises steeping the said masses of starch bearing material in water to substantial saturation of the same, whereby the fibrous material is rendered more tough and flexible than it is in its air dry state, subjecting the starch bearing material to impacting substantially without abrasion to knock the starch granules loose from the confining proteinaceous and fibrous material with minimum fragmenting of the same and recovering the starch granules.

7. The process of claim 6 wherein the starch bearing material consists of corn, the water content of which after steeping is about 45% by weight.

8. A process for extracting starch from small masses of naturally occurring starch bearing material consisting of grain such as corn in which starch granules are held in cells consisting in large part of fibrous material which comprises steeping the kernels in water to substantially saturate the same whereby the fibrous material is rendered substantially more pliable than it is in air dry condition, breaking the kernels to release the germ, separating and removing the germ from said broken material, treating the separated starch bearing material by impacting substantially without abrasion to knock the starch granules loose from the fibrous material with minimum breakage of the fibrous material, and separating the starch granules from the fibrous material.

9. The process of claim 8 wherein the majority of the material after the impacting step will remain on a screen having an aperture of about 0.093 inch.

10. A process for extracting starch from grain such as corn, wherein the starch granules are confined in proteinaceous and fibrous materials, which comprises steeping the kernels in water to substantially saturate the same, whereby said materials are rendered substantially shatter resistant, breaking the saturated kernels to release the germ, separating and removing the germ to achieve degerminated material, subjecting said wet degerminated material to impact substantially without rubbing to release the starch granules from said latter material, and separating the starch granules from said latter material.

References Cited in the file of this patent

UNITED STATES PATENTS

| | | |
|---|---|---|
| 2,050,330 | Jefferies | Aug. 11, 1936 |
| 2,089,404 | Newkirk | Aug. 10, 1937 |
| 2,428,670 | Hulse | Oct. 7, 1947 |
| 2,573,048 | Newkirk | Oct. 30, 1951 |
| 2,644,740 | Dodds | July 7, 1953 |
| 2,651,470 | Dodds et al. | Sept. 8, 1953 |